US012702961B2

(12) United States Patent
Anzai et al.

(10) Patent No.: US 12,702,961 B2
(45) Date of Patent: Aug. 11, 2026

(54) RESISTIVITY ADJUSTMENT DEVICE AND RESISTIVITY ADJUSTMENT METHOD

(71) Applicant: DIC Corporation, Tokyo (JP)

(72) Inventors: Daijirou Anzai, Ichihara (JP); Naoki Hada, Ichihara (JP); Kazumi Oi, Ichihara (JP)

(73) Assignee: DIC Corporation, Tokyo (JP)

( * ) Notice: Subject to any disclaimer, the term of this patent is extended or adjusted under 35 U.S.C. 154(b) by 428 days.

(21) Appl. No.: 18/571,306

(22) PCT Filed: Jun. 23, 2022

(86) PCT No.: PCT/JP2022/025005
§ 371 (c)(1),
(2) Date: Dec. 18, 2023

(87) PCT Pub. No.: WO2023/276837
PCT Pub. Date: Jan. 5, 2023

(65) Prior Publication Data

US 2024/0286098 A1 Aug. 29, 2024

(30) Foreign Application Priority Data

Jul. 1, 2021 (JP) ................................ 2021-109991

(51) Int. Cl.
*B01F 35/83* (2022.01)
*B01F 21/20* (2022.01)
(Continued)

(52) U.S. Cl.
CPC ............ *B01F 35/833* (2022.01); *B01F 21/20* (2022.01); *B01F 25/40* (2022.01); *B01F 2101/58* (2022.01);
(Continued)

(58) Field of Classification Search
CPC .............. B01F 21/20; B01F 23/231244; B01F 23/23762; B01F 25/40; B01F 35/833;
(Continued)

(56) References Cited

U.S. PATENT DOCUMENTS

2004/0112349 A1 6/2004 Livingston et al.
2004/0226507 A1 11/2004 Carpenter et al.
(Continued)

FOREIGN PATENT DOCUMENTS

JP 2003-010660 A 1/2003
JP 3951385 B2 8/2007
(Continued)

*Primary Examiner* — Charles S Bushey
(74) *Attorney, Agent, or Firm* — Troutman Pepper Locke LLP

(57) ABSTRACT

Even when the flow rate at which liquid is supplied varies, the variation in the resistivity of resistivity-adjusted liquid is suppressed by using a simple structure. The hollow fiber membrane module is sectioned into a liquid-phase region and a gas-phase region by hollow fiber membranes. The liquid-phase region receives liquid L whose resistivity is to be adjusted. The gas-phase region receives adjustment gas G used to adjust a resistivity of the liquid L. The module passage pipe communicates with the liquid-phase region of the hollow fiber membrane module, the liquid supply pipe, and the liquid discharge pipe and passes through the hollow fiber membrane module. The bypass pipe communicates with the liquid supply pipe and the liquid discharge pipe and bypasses the hollow fiber membrane module. The bypass pipe includes a laminarization unit including a plurality of thin tubes thinner than the module passage pipe.

20 Claims, 7 Drawing Sheets

(51) Int. Cl.
*B01F 25/40* (2022.01)
*B01F 101/58* (2022.01)

(52) U.S. Cl.
CPC ................. *B01F 2215/0431* (2013.01); *B01F 2215/0459* (2013.01)

(58) Field of Classification Search
CPC .......... B01F 2101/58; B01F 2215/0431; B01F 2215/0459
USPC .......................................................... 261/104
See application file for complete search history.

(56) References Cited

U.S. PATENT DOCUMENTS

| | | | |
|---|---|---|---|
| 2006/0101908 A1 | 5/2006 | Meneghini et al. | |
| 2018/0078909 A1 | 3/2018 | Oi et al. | |
| 2019/0224633 A1* | 7/2019 | Saito ................. | B01F 25/31322 |

FOREIGN PATENT DOCUMENTS

| | | | |
|---|---|---|---|
| JP | 2012-223725 | A | 11/2012 |
| JP | 5862043 | B2 | 2/2016 |
| JP | 6688059 | B2 | 4/2020 |
| TW | 201838710 | A | 11/2018 |

* cited by examiner

RESISTIVITY ADJUSTMENT DEVICE AND RESISTIVITY ADJUSTMENT METHOD

TECHNICAL FIELD

An aspect of the present invention relates to a resistivity adjustment device and a resistivity adjustment method for adjusting a resistivity of liquid.

BACKGROUND ART

A semiconductor or liquid crystal manufacturing process involves cleaning of a substrate using ultrapure water. When the ultrapure water has a high resistivity, static electricity is generated. Accordingly, dielectric breakdown or reattachment of fine particles occurs, and this causes a serious adverse effect on the yield of the product. To solve such a problem, a method using a hydrophobic hollow fiber membrane module has been proposed. In this method, the hollow fiber membrane module is used to dissolve gas, such as carbonic acid gas or ammonia gas, in the ultrapure water. Accordingly, ions are generated by dissociation equilibrium, and the resistivity of the ultrapure water is lowered by the generated ions.

When the substrate is subjected to cleaning or dicing, for example, the flow of the ultrapure water rapidly varies. Accordingly, PTL 1 proposes a technology for stabilizing the resistivity even when the flow rate varies. According to the technology described in PTL 1, a hollow fiber membrane module and a bypass pipe are provided. The hollow fiber membrane module generates gas-added ultrapure water at a low flow rate. The bypass pipe allows ultrapure water to pass therethrough at a high flow rate. The generated gas-added ultrapure water is merged with the ultrapure water passing through the bypass pipe. Thus, the resistivity of the ultrapure water can be easily adjusted.

However, according to the technology described in PTL 1, when the ultrapure water flows at a low flow rate, the flow rate of the ultrapure water supplied to the hollow fiber membrane module may be reduced relative to the flow rate of the ultrapure water bypassing the hollow fiber membrane module, and this may lead to an increase in the resistivity of ultrapure water. Accordingly, PTL 2 proposes a technology in which a plurality of bypass pipes is provided and in which one or more of the bypass pipes are provided with respective shutting valves. According to the technology described in PTL 2, when the flow rate of the ultrapure water decreases, one or more of the shutting valves are closed. Thus, when the ultrapure water flows at a low flow rate, the reduction in the flow rate of the ultrapure water supplied to the hollow fiber membrane module relative to the flow rate of the ultrapure water bypassing the hollow fiber membrane module is suppressed.

CITATION LIST

Patent Literature

PTL 1: Japanese Patent No. 3951385

PTL 2: Japanese Unexamined Patent Application Publication No. 2012-223725

SUMMARY OF INVENTION

Technical Problem

However, according to the technology described in PTL 2, the shutting valves attached to the bypass pipes need to be opened or closed in accordance with the flow rate of the ultrapure water, and this makes the device complex and expensive. In addition, according to the technology described in PTL 2, when the supply flow rate varies, the pressure loss in the bypass pipes suddenly changes in response to the opening/closing of the shutting valves.

Accordingly, an object of one aspect of the present invention is to provide a resistivity adjustment device and a resistivity adjustment method for suppressing the variation in the resistivity of resistivity-adjusted liquid by using a simple structure even when the flow rate at which liquid is supplied varies.

Solution to Problem

The inventors of the present invention have carried out intensive studies regarding the above-described problem, and obtained the following findings. That is, in the resistivity adjustment devices according to the related art, the flow of the liquid through the bypass pipes is turbulent, and the turbulent flow in the bypass pipes largely affects the variation in the resistivity of resistivity-adjusted liquid in response to the variation in the liquid supplied to the resistivity adjustment device. This is not limited to the case in which the supplied liquid is ultrapure water, but also applies to cases in which various liquids other than ultrapure water are supplied. The resistivity-adjusted liquid is liquid whose resistivity is adjusted by the resistivity adjustment device.

More specifically, a pressure loss of liquid in a bypass pipe in which the flow of the liquid is turbulent is exponential to the flow rate of the liquid. The flow rate of the liquid supplied to a module passage pipe passing through a hollow fiber membrane module is lower than the flow rate of the liquid supplied to the bypass pipe bypassing the hollow fiber membrane module. Therefore, unlike the pressure loss of the liquid in the bypass pipe, the pressure loss of the liquid in the module passage pipe and the hollow fiber membrane module can be regarded as being proportional to the flow rate of the liquid irrespective of whether or not the flow of the liquid in the module passage pipe and the hollow fiber membrane module is turbulent. Thus, the tendency of the pressure loss greatly differs between the liquid in the bypass pipe and the liquid in the module passage pipe and the hollow fiber membrane module.

Therefore, as the flow rate of the liquid supplied to the resistivity adjustment device varies, the distribution ratio of the liquid between the module passage pipe and the bypass pipe varies (shifts), and the resistivity of the resistivity-adjusted liquid varies accordingly. In particular, when the flow rate of the liquid supplied to the resistivity adjustment device decreases, the distribution ratio of the liquid supplied to the bypass pipe to the liquid supplied to the module passage pipe increases, and the resistivity of the resistivity-adjusted liquid increases accordingly.

Accordingly, the inventors of the present invention have addressed the above-described problem by bringing the tendency of the pressure loss of the liquid in the bypass pipe closer to the tendency of the pressure loss of the liquid in the module passage pipe and the hollow fiber membrane module.

A resistivity adjustment device according to an aspect of the present invention includes a hollow fiber membrane module, a liquid supply pipe, a liquid discharge pipe, a module passage pipe, and a bypass pipe. The hollow fiber membrane module is sectioned into a liquid-phase region and a gas-phase region by a hollow fiber membrane. The liquid-phase region receives liquid whose resistivity is to be adjusted. The gas-phase region receives adjustment gas used to adjust a resistivity of the liquid. The module passage pipe communicates with the liquid-phase region of the hollow fiber membrane module, the liquid supply pipe, and the liquid discharge pipe and passes through the hollow fiber membrane module. The bypass pipe communicates with the liquid supply pipe and the liquid discharge pipe and bypasses the hollow fiber membrane module. The bypass pipe includes a laminarization unit including a plurality of thin tubes thinner than the module passage pipe.

In this resistivity adjustment device, the liquid is supplied to the liquid supply pipe, and the adjustment gas is supplied to the gas-phase region of the hollow fiber membrane module. The liquid supplied to the liquid supply pipe is distributed between the module passage pipe and the bypass pipe. The liquid supplied to the module passage pipe is supplied to the liquid-phase region of the hollow fiber membrane module. In the hollow fiber membrane module, the adjustment gas that has passed through the hollow fiber membrane is dissolved into the liquid supplied to the liquid-phase region, so that adjustment gas-added liquid, which is the liquid in which the adjustment gas is dissolved, is generated. The adjustment gas-added liquid generated in the hollow fiber membrane module and the liquid that has bypassed the hollow fiber membrane module merge into the resistivity-adjusted liquid in the liquid discharge pipe, and the resistivity-adjusted liquid is discharged from the resistivity adjustment device.

Since the bypass pipe includes the laminarization unit including the thin tubes that are thinner than the module passage pipe, laminarization of the flow of the liquid in the bypass pipe can be achieved. The pressure loss of liquid in a laminar flow is proportional to the flow rate of the liquid. Even when the flow is not laminar, the pressure loss of the liquid becomes more proportional to the flow rate of the liquid as the flow shifts from turbulent to laminar. The flow rate of the liquid supplied to the module passage pipe is lower than the flow rate of the liquid supplied to the bypass pipe. Therefore, unlike the pressure loss of the liquid in the bypass pipe, the pressure loss of the liquid in the module passage pipe and the hollow fiber membrane module can be regarded as being proportional to the flow rate of the liquid irrespective of whether or not the flow of the liquid through the module passage pipe and the hollow fiber membrane module is turbulent. In other words, the tendency of the pressure loss of the liquid in the bypass pipe is close to the tendency of the pressure loss of the liquid in the module passage pipe and the hollow fiber membrane module. Therefore, even when the flow rate of the liquid supplied to the resistivity adjustment device varies, the variation in the distribution ratio of the liquid between the module passage pipe and the bypass pipe can be suppressed, and accordingly the variation in the resistivity of the resistivity-adjusted liquid can be suppressed. In particular, even when the liquid is supplied to the resistivity adjustment device at a low flow rate, the increase in the ratio of the liquid supplied to the bypass pipe to the liquid supplied to the module passage pipe can be suppressed, so that the increase in the resistivity of the resistivity-adjusted liquid can be suppressed. Therefore, even when the flow rate at which the liquid is supplied varies, the variation in the resistivity of the resistivity-adjusted liquid can be suppressed by using a simple structure.

In one embodiment, the laminarization unit may be set so that when ultrapure water is supplied to the bypass pipe as the liquid at a specified flow rate, a flow of the liquid in the laminarization unit is laminar. In this resistivity adjustment device, since the laminarization unit is set so that the flow of the liquid in the laminarization unit is laminar when ultrapure water is supplied to the bypass pipe as the liquid at the specified flow rate, the laminarization unit can be easily designed and, even when the flow rate at which the liquid is supplied varies, the variation in the resistivity of the resistivity-adjusted liquid can be further suppressed.

In one embodiment, the laminarization unit may be set so that when ultrapure water is supplied to the bypass pipe as the liquid at a specified flow rate, a Reynolds number in the laminarization unit is 2300 or less. In this resistivity adjustment device, since the laminarization unit is set so that the Reynolds number in the laminarization unit is 2300 or less when ultrapure water is supplied to the bypass pipe as the liquid at the specified flow rate, the laminarization unit can be easily designed and, even when the flow rate at which the liquid is supplied varies, the variation in the resistivity of the resistivity-adjusted liquid can be further suppressed.

In one embodiment, the plurality of thin tubes may include five or more thin tubes. In this resistivity adjustment device, since the number of thin tubes is five or more, the liquid flows through the laminarization unit at a sufficient flow rate, and the laminarization of the flow of the liquid in the laminarization unit can be facilitated.

In one embodiment, each of the plurality of thin tubes may have an inner diameter of 0.01 mm or more and 10 mm or less. In this resistivity adjustment device, since each of the thin tubes has an inner diameter of 0.01 mm or more and 10 mm or less, the pressure loss of the liquid in the laminarization unit does not become excessively large or small, and the laminarization of the flow of the liquid in the laminarization unit can be facilitated.

In one embodiment, each of the plurality of thin tubes may have a length of 1 mm or more and 1000 mm or less. In this resistivity adjustment device, since each of the thin tubes has a length of 1 mm or more and 1000 mm or less, the pressure loss of the liquid in the laminarization unit does not become excessively large or small.

In one embodiment, the laminarization unit may have a length of 1% or more of a length of the bypass pipe. In this resistivity adjustment device, since the laminarization unit has a length of 1% or more of the length of the bypass pipe, the laminarization of the flow of the liquid in the bypass pipe can be facilitated.

In one embodiment, the resistivity adjustment device may further include a branching module and a merging module. The branching module may be connected to the liquid supply pipe, the module passage pipe, and the bypass pipe to provide communication between the liquid supply pipe, the module passage pipe, and the bypass pipe. The merging module may be connected to the liquid discharge pipe, the module passage pipe, and the bypass pipe to provide communication between the liquid discharge pipe, the module passage pipe, and the bypass pipe. The laminarization unit extends from the branching module to the merging module. In this case, since the resistivity adjustment device includes the branching module and the merging module, the branching structure connecting the liquid supply pipe to the module passage pipe and the bypass pipe and the merging structure connecting the module passage pipe and the bypass pipe to the liquid discharge pipe can be easily provided. In particular, since the bypass pipe includes the laminarization unit including the thin tubes, the bypass pipe can be easily connected to the liquid supply pipe with the branching module, and to the liquid discharge pipe with the merging module. Since the laminarization unit extends from the branching module to the merging module, the laminarization unit can be easily formed, and the laminarization of the flow of liquid in the laminarization unit can be facilitated.

In one embodiment, the resistivity adjustment device may further include a gas supply pipe and a gas discharge pipe. The gas supply pipe may communicate with the gas-phase region to enable the adjustment gas to be supplied to the gas-phase region. The gas discharge pipe may communicate with the gas-phase region to enable the adjustment gas to be discharged from the gas-phase region. In this case, since the resistivity adjustment device includes the gas supply pipe and the gas discharge pipe, the adjustment gas can be easily supplied to and discharged from the gas-phase region GA of the hollow fiber membrane module.

In one embodiment, the resistivity adjustment device may further include a valve attached to the module passage pipe to adjust a distribution ratio of the liquid between the module passage pipe and the bypass pipe. In this case, since the resistivity adjustment device includes the valve, the distribution ratio of the liquid between the module passage pipe and the bypass pipe can be easily adjusted. Since the valve is attached to the module passage pipe, the laminarization by the bypass pipe is not impeded by the valve.

A resistivity adjustment device according to an aspect of the present invention includes adjusting a resistivity of liquid in any of the above-described resistivity adjustment devices by supplying the liquid to the liquid supply pipe and supplying the adjustment gas to the gas-phase region of the hollow fiber membrane module.

In this resistivity adjustment method, the resistivity of the liquid is adjusted in the above-described resistivity adjustment device by supplying the liquid to the liquid supply pipe and supplying the adjustment gas to the gas-phase region GA of the hollow fiber membrane module. Therefore, even when the flow rate at which the liquid is supplied varies, the variation in the resistivity of the resistivity-adjusted liquid can be suppressed by using a simple structure.

Advantageous Effects of Invention

According to an aspect of the present invention, even when the flow rate at which liquid is supplied varies, the variation in the resistivity of the resistivity-adjusted liquid can be suppressed by using a simple structure.

DESCRIPTION OF EMBODIMENTS

The resistivity adjustment device and the resistivity adjustment method according to an embodiment will now be described in detail with reference to the drawings. In all drawings, the same or corresponding portions are denoted by the same reference signs, and redundant explanations are omitted.

Figure 1:
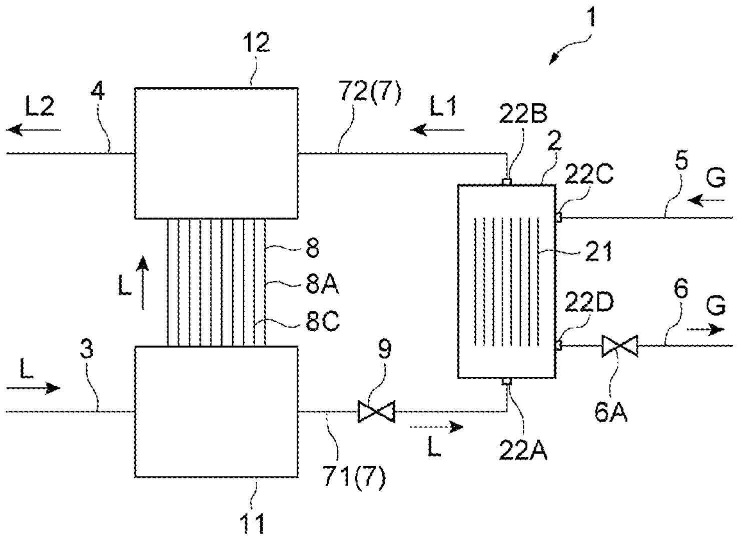
FIG. 1 is a schematic diagram of a resistivity adjustment device according to an embodiment.

FIG. 1 is a schematic diagram of a resistivity adjustment device according to an embodiment. As illustrated in FIG. 1, a resistivity adjustment device 1 according to the present embodiment generates adjustment gas-added liquid L1 by dissolving adjustment gas G into liquid L. The resistivity adjustment device 1 also generates resistivity-adjusted liquid L2 by merging the liquid L and the adjustment gas-added liquid L1 to adjust the resistivity of the liquid L. The adjustment gas-added liquid L1 is the liquid L in which the adjustment gas G is dissolved, and the resistivity-adjusted liquid L2 is the liquid L whose resistivity is adjusted. Therefore, the adjustment gas-added liquid L1 and the resistivity-adjusted liquid L2 may simply be referred to as the liquid L. The resistivity adjustment device 1 includes a hollow fiber membrane module 2, a liquid supply pipe 3, a liquid discharge pipe 4, a gas supply pipe 5, a gas discharge pipe 6, a module passage pipe 7, a bypass pipe 8, a valve 9, a branching module 11, and a merging module 12.

The hollow fiber membrane module 2 is a module for dissolving the adjustment gas G used to adjust the resistivity into the liquid L whose resistivity is to be adjusted. The hollow fiber membrane module 2 includes a plurality of hollow fiber membranes 21 and a housing 22 containing the hollow fiber membranes 21.

The liquid L is the liquid whose resistivity is or is to be adjusted. The liquid used as the liquid L is not particularly limited and may be, for example, pure water or ultrapure water for cleaning, for example, a semiconductor or liquid crystal material. The pure water and ultrapure water typically have a resistivity of 0.1 MΩ·cm or more. Therefore, the resistivity of the liquid L may be in the range of, for example, 0.1 MΩ·cm or more, preferably 15.0 MΩ·cm or more, and more preferably 17.5 MΩ·cm or more. The upper limit of the resistivity of the liquid L is not particularly limited. For example, the resistivity of the liquid L may be in the range of 18.248 MΩ·cm or less.

The temperature of the liquid L is not particularly limited and may be, for example, in the range of 5° C. or more, preferably 10° C. or more, and more preferably 20° C. or more, and in the range of 60° C. or less, preferably 40° C. or less, and more preferably 30° C. or less. The supply pressure of the liquid L is not particularly limited and may be, for example, in the range of 0.01 MPa or more, preferably 0.1 MPa or more, and more preferably 0.2 MPa or more, and in the range of 1.0 MPa or less, preferably 0.4 MPa or less, and more preferably 0.3 MPa or less.

The adjustment gas G is the gas used to adjust the resistivity of the liquid L. The gas used as the adjustment gas G is not particularly limited and may be, for example, carbonic acid gas or ammonia gas. The temperature of the adjustment gas G is not particularly limited and may be, for example, in the range of 0° C. or more, preferably 20° C. or more, and more preferably 25° C. or more, and in the range of 60° C. or less, preferably 50° C. or less, and more preferably 30° C. or less. The supply pressure of the adjustment gas G is not particularly limited and may be, for example, in the range of 0.01 MPa or more, and preferably 0.05 MPa or more, and in the range of 0.5 MPa or less, preferably 0.2 MPa or less, and more preferably 0.15 MPa or less.

Each hollow fiber membrane 21 is a membrane in the form of a hollow fiber that allows the permeation of gas but not liquid. The material, shape, form, etc., of the hollow fiber membranes 21 are not particularly limited. The housing 22 is a sealed container containing the hollow fiber membranes 21. The membrane area of the hollow fiber membrane module 2 can be adjusted as appropriate based on the process flow rate (flow rate of the liquid L), and is not particularly limited. For example, the membrane area may be in the range of 0.1 $m^2$ or more and 120 $m^2$ or less. When the optimum membrane area of the hollow fiber membrane module 2 is adjusted based on the process flow rate, the membrane area may be in the range of, for example, 0.1 $m^2$ or more and 4.0 $m^2$ or less for a typical process flow rate (for example, 1 to 120 L/min), and 4.0 $m^2$ or more and 120 $m^2$ or less for a high process flow rate (for example, 120 to 4000 L/min).

The hollow fiber membrane module 2 includes the hollow fiber membranes 21 and the housing 22 containing the hollow fiber membranes 21. The hollow fiber membrane module 2 includes the hollow fiber membranes 21 and the housing 22 containing the hollow fiber membranes 21.

Figure 2:
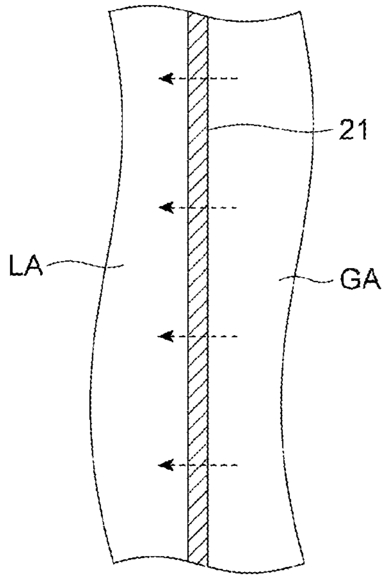
FIG. 2 is an enlarged sectional view of a part of a hollow fiber membrane.

FIG. 2 is an enlarged sectional view of a part of a hollow fiber membrane. As illustrated in FIG. 2, the hollow fiber membrane module 2 is sectioned into a liquid-phase region LA and a gas-phase region GA by each hollow fiber membrane 21. The liquid-phase region LA is one of the regions of the hollow fiber membrane module 2 that receives the liquid L whose resistivity is to be adjusted. The gas-phase region GA is one of the regions of the hollow fiber membrane module 2 that receives the adjustment gas G used to adjust the resistivity. The types of the hollow fiber membrane module 2 include an internal perfusion type and an external perfusion type. In the present embodiment, the hollow fiber membrane module 2 may be of either the internal perfusion type or the external perfusion type. When the hollow fiber membrane module 2 is of the external perfusion type, the inner region (inner surface side) of the hollow fiber membrane 21 serves as the gas-phase region GA, and the outer region (outer surface side) of the hollow fiber membrane 21 serves as the liquid-phase region LA. When the hollow fiber membrane module 2 is of the internal perfusion type, the inner region (inner surface side) of the hollow fiber membrane 21 serves as the liquid-phase region LA, and the outer region (outer surface side) of the hollow fiber membrane 21 serves as the gas-phase region GA. In the hollow fiber membrane module 2, the adjustment gas G supplied to the gas-phase region GA and caused to pass the hollow fiber membrane 21 is dissolved in the liquid L supplied to the liquid-phase region LA, so that the adjustment gas-added liquid L1 is generated.

As illustrated in FIG. 1, the housing 22 has a liquid supply port 22A, a liquid discharge port 22B, a gas supply port 22C, and a gas discharge port 22D. The liquid supply port 22A is an opening formed in the housing 22 to enable the liquid L to be supplied to the liquid-phase region LA. The liquid discharge port 22B is an opening formed in the housing 22 to enable the adjustment gas-added liquid L1 to be discharged from the liquid-phase region LA. The gas supply port 22C is an opening formed in the housing 22 to enable the adjustment gas G to be supplied the gas-phase region GA. The gas discharge port 22D is an opening formed in the housing 22 to enable the adjustment gas G to be discharged from the gas-phase region GA. Therefore, the liquid supply port 22A and the liquid discharge port 22B communicate with the liquid-phase region LA. The gas supply port 22C and the gas discharge port 22D communicate with the gas-phase region GA. The positions of the liquid supply port 22A, the liquid discharge port 22B, the gas supply port 22C, and the gas discharge port 22D in the housing 22 are not particularly limited.

Figure 3:
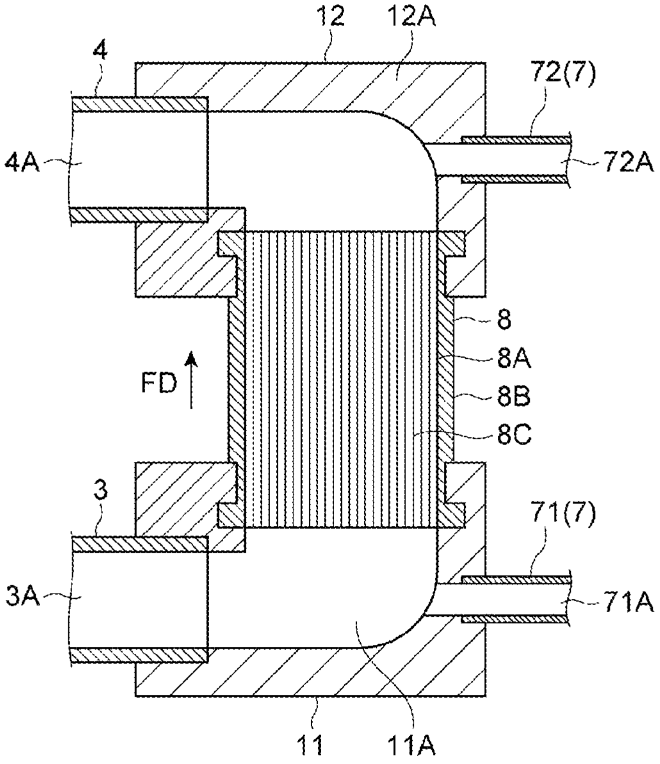
FIG. 3 is a sectional view of a part of the resistivity adjustment device illustrated in FIG. 1.

FIG. 3 is a sectional view of a part of the resistivity adjustment device illustrated in FIG. 1. As illustrated in FIGS. 1 and 3, the liquid supply pipe 3 is a pipe-shaped member in which a flow passage 3A for the liquid L is formed. The liquid L is supplied through the liquid supply pipe 3. The material, properties (e.g., hardness and elasticity), shape, dimensions, etc., of the liquid supply pipe 3 are not particularly limited.

The liquid discharge pipe 4 is a pipe-shaped member in which a flow passage 4A for the resistivity-adjusted liquid L2 is formed. The resistivity-adjusted liquid L2 is discharged through the liquid discharge pipe 4. The material, properties (e.g., hardness and elasticity), shape, dimensions, etc., of the liquid discharge pipe 4 are not particularly limited.

The gas supply pipe 5 is a pipe-shaped member in which a flow passage (not illustrated) for the adjustment gas G is formed. The gas supply pipe 5 is connected to the gas supply port 22C and communicates with the gas-phase region GA of the hollow fiber membrane module 2 to enable the adjustment gas G to be supplied to the gas-phase region GA of the hollow fiber membrane module 2. The material, properties (e.g., hardness and elasticity), shape, dimensions, etc., of the gas supply pipe 5 is not particularly limited.

The gas discharge pipe 6 is a pipe-shaped member in which a flow passage (not illustrated) for the adjustment gas G is formed. The gas discharge pipe 6 is connected to the gas discharge port 22D and communicates with the gas-phase region GA of the hollow fiber membrane module 2 to enable the adjustment gas G to be discharged from the gas-phase region GA of the hollow fiber membrane module 2. A valve 6A for opening and closing the flow passage of the gas discharge pipe 6 is attached to the gas discharge pipe 6. The valve 6A on the gas discharge pipe 6 may be opened to enable the adjustment gas G, for example, to be discharged from the gas-phase region GA of the hollow fiber membrane module 2. The valve 6A on the gas discharge pipe 6 may be closed to prevent the adjustment gas G, for example, from being discharged from the gas-phase region GA of the hollow fiber membrane module 2. The valve 6A may be capable of adjusting the opening degree of the flow passage in the gas discharge pipe 6. The material, properties (e.g., hardness and elasticity), shape, dimensions, etc., of the gas discharge pipe 6 is not particularly limited. The gas discharge pipe 6 may have a leakage port (not illustrated) that allows leakage of the adjustment gas G from the gas-phase region GA of the hollow fiber membrane module 2. The adjustment gas G constantly leaks through the leakage port.

The module passage pipe 7 communicates with the liquid-phase region LA of the hollow fiber membrane module 2, the liquid supply pipe 3, and the liquid discharge pipe 4, and passes through the hollow fiber membrane module 2. In other words, the hollow fiber membrane module 2 is disposed at an intermediate position of the module passage pipe 7. The module passage pipe 7 includes an upstream module passage pipe 71 and a downstream module passage pipe 72. The upstream module passage pipe 71 is disposed upstream of the hollow fiber membrane module 2 in the direction in which the liquid L flows. The downstream module passage pipe 72 is disposed downstream of the hollow fiber membrane module 2 in the direction in which the liquid L flows.

The upstream module passage pipe 71 is a pipe-shaped member in which a flow passage 71A is formed. The upstream module passage pipe 71 communicates with the liquid supply pipe 3 and the liquid-phase region LA of the hollow fiber membrane module 2 to enable the liquid L supplied to the liquid supply pipe 3 to be supplied to the liquid-phase region LA of the hollow fiber membrane module 2. An upstream end of the upstream module passage pipe 71 is connected to the branching module 11 to communicate with the flow passage 3A in the liquid supply pipe 3. A downstream end of the upstream module passage pipe 71 is connected to the liquid supply port 22A to communicate with the liquid-phase region LA of the hollow fiber membrane module 2. The material, properties (e.g., hardness and elasticity), shape, dimensions, etc., of the upstream module passage pipe 71 are not particularly limited. The flow passage 71A in the upstream module passage pipe 71 preferably has a cross-sectional area less than the cross-sectional area of the flow passage 3A in the liquid supply pipe 3.

The downstream module passage pipe 72 is a pipe-shaped member in which a flow passage 72A is formed. The downstream module passage pipe 72 communicates with the liquid discharge pipe 4 and the liquid-phase region LA of the hollow fiber membrane module 2 to enable the adjustment gas-added liquid L1 generated in the hollow fiber membrane module 2 to be discharged to the liquid discharge pipe 4. An upstream end of the downstream module passage pipe 72 is connected to the liquid discharge port 22B to communicate with the liquid-phase region LA of the hollow fiber membrane module 2. A downstream end of the downstream module passage pipe 72 is connected to the merging module 12 to communicate with the flow passage 4A in the liquid discharge pipe 4. The material, properties (e.g., hardness and elasticity), shape, dimensions, etc., of the downstream module passage pipe 72 are not particularly limited. The flow passage 72A in the downstream module passage pipe 72 preferably has a cross-sectional area less than the cross-sectional area of the flow passage 4A in the liquid discharge pipe 4.

Figure 4:
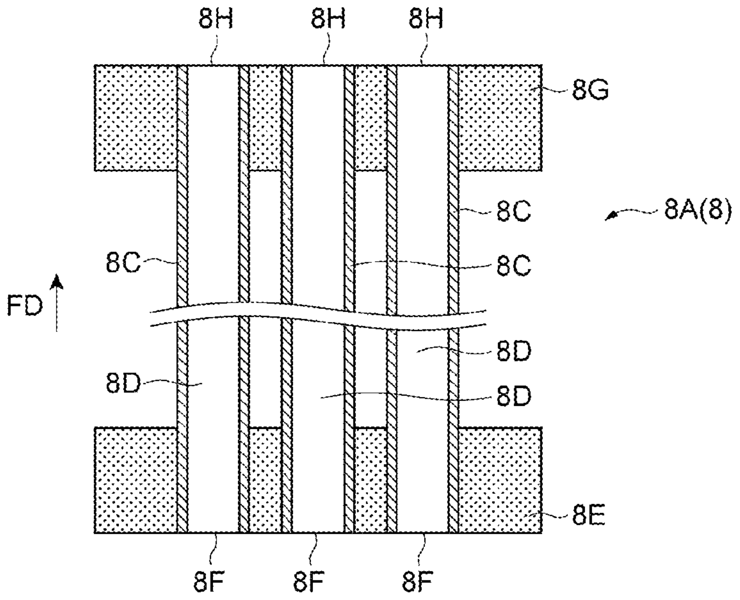
FIG. 4 is an enlarged sectional view of a part of a bypass pipe.

FIG. 4 is an enlarged sectional view of a part of the bypass pipe. As illustrated in FIGS. 1, 3, and 4, the bypass pipe 8 communicates with the liquid supply pipe 3 and the liquid discharge pipe 4 and bypasses the hollow fiber membrane module 2. Thus, the bypass pipe 8 is not connected to the hollow fiber membrane module 2, and allows the liquid L supplied to the liquid supply pipe 3 to be discharged to the liquid discharge pipe 4 without passing through the hollow fiber membrane module 2. The direction from the liquid supply pipe 3 to the liquid discharge pipe 4 through the bypass pipe 8 is referred to as a flow direction FD from the liquid supply pipe 3 to the liquid discharge pipe 4. The flow direction FD from the liquid supply pipe 3 to the liquid discharge pipe 4 is also referred to simply as the flow direction FD. An upstream end (upstream end in the flow direction FD) of the bypass pipe 8 is connected to the branching module 11 to communicate with the liquid supply pipe 3. A downstream end (downstream end in the flow direction FD) of the bypass pipe 8 is connected to the merging module 12 to communicate with the liquid discharge pipe 4. The bypass pipe 8 has no valve, such as a shutting valve, for opening and closing the bypass pipe 8.

The bypass pipe 8 includes a laminarization unit 8A and a bypass housing 8B containing the laminarization unit 8A.

The bypass housing 8B has a tubular shape so that the laminarization unit 8A can be contained therein. An upstream end (upstream end in the flow direction FD) of the bypass housing 8B is hermetically connected to the branching module 11. A downstream end (downstream end in the flow direction FD) of the bypass housing 8B is hermetically connected to the merging module 12. Thus, the laminarization unit 8A extends from the branching module 11 to the merging module 12. The hermetic connection between the bypass housing 8B and each of the branching module 11 and the merging module 12 can be formed by, for example, adhesion, fusion, fitting, or a combination thereof. The material, properties (e.g., hardness and elasticity), shape, dimensions, etc., of the bypass housing 8B are not particularly limited. The bypass housing 8B preferably has a straight tubular shape.

The laminarization unit 8A includes a plurality of thin tubes 8C to achieve laminarization of the flow of the liquid L in the bypass pipe 8. The term "laminarization" means not only to make a flow laminar but also to make a turbulent flow closer to a laminar flow. The laminar flow is, for example, a flow with a Reynolds number of 2300 or less. To make a turbulent flow closer to a laminar flow means to, for example, reduce the Reynolds number to a value closer to 2300. The laminarization unit 8A may be set so that, for example, when ultrapure water is supplied to the bypass pipe 8 as the liquid L at a specified flow rate, the flow of the liquid L in the laminarization unit 8A is laminar. The laminarization unit 8A may be set so that, for example, when ultrapure water is supplied to the bypass pipe 8 as the liquid L at a specified flow rate, the Reynolds number in the laminarization unit 8A is 2300 or less, preferably 2000 or less, and more preferably 500 or less. The specified flow rate may be, for example, any value that is 0.1 L/min or more and 120 L/min or less.

Each of the thin tubes 8C is a pipe-shaped member in which a flow passage 8D is formed. Each of the thin tubes 8C is thinner than the module passage pipe 7 (the upstream module passage pipe 71 and the downstream module passage pipe 72). In other words, the flow passage 8D in each of the thin tubes 8C has a cross-sectional area less than the cross-sectional area of the flow passage 71A in the upstream module passage pipe 71 and the cross-sectional area of the flow passage 72A in the downstream module passage pipe 72. The total cross-sectional area of the flow passages 8D in the thin tubes 8C is greater than, for example, the cross-sectional area of the flow passage 71A in the upstream module passage pipe 71 and the cross-sectional area of the flow passage 72A in the downstream module passage pipe 72. Each of the thin tubes 8C is made of, for example, polymethylpentene (PMP), polypropylene (PP), polyethylene (PE), urethane, polytetrafluoroethylene (PFA), or nylon.

Upstream ends of the thin tubes 8C are fixed to the bypass housing 8B or the branching module 11 by a first sealing portion 8E. Downstream ends of the thin tubes 8C are fixed to the bypass housing 8B or the merging module 12 by a second sealing portion 8G. The thin tubes 8C extend from the branching module 11 to the merging module 12. The lengths of the laminarization unit 8A and each of the thin tubes 8C are the lengths in the flow direction FD.

The first sealing portion 8E does not block the flow passage 8D in each of the thin tubes 8C but seals the gaps between the thin tubes 8C and portions of the bypass housing 8B or the branching module 11 to which the thin tubes 8C are fixed. In other words, the first sealing portion 8E fills the gaps between the thin tubes 8C and between the thin tubes 8C and the portions of the bypass housing 8B or the branching module 11 to which the thin tubes 8C are fixed (see FIG. 4). The flow passage 8D of each of the thin tubes 8C is exposed at an upstream end face 8F and communicates with the branching module 11. Thus, the liquid L supplied to the bypass pipe 8 is supplied to the flow passage 8D in each thin tube 8C from the upstream end face 8F of the thin tube 8C. The first sealing portion 8E is made of, for example, a resin. The resin used to form the first sealing portion 8E may be, for example, an epoxy resin, an urethane resin, an ultraviolet curable resin, or a polyolefin resin, such as polyethylene or polypropylene.

The second sealing portion 8G does not block the flow passage 8D in each of the thin tubes 8C but seals the gaps between the thin tubes 8C and portions of the bypass housing 8B or the merging module 12 to which the thin tubes 8C are fixed. In other words, the second sealing portion 8G fills the gaps between the thin tubes 8C and between the thin tubes 8C and the portions of the bypass housing 8B or the merging module 12 to which the thin tubes 8C are fixed (see FIG. 4). The flow passage 8D in each of the thin tubes 8C is exposed at a downstream end face 8H and communicates with the merging module 12. Thus, the liquid L supplied to the flow passage 8D in each thin tube 8C is discharged from the downstream end face 8H of the thin tube 8C. The second sealing portion 8G is made of, for example, a resin. The resin used to form the second sealing portion 8G may be, for example, an epoxy resin, an urethane resin, an ultraviolet curable resin, or a polyolefin resin, such as polyethylene or polypropylene.

The Reynolds number Re of the liquid L flowing in each of the thin tubes 8C can be determined by Equation (1) given below. In Equation (1), V is the flow velocity (m/s) of the liquid L flowing through each of the thin tubes 8C, D is the inner diameter (m) of each of the thin tubes 8C, and ν is the kinematic viscosity ($m^2/s$) of the liquid L, ρ is the density ($kg/m^3$) of the liquid L, and μ is the viscosity (Pa·s) of the liquid L.

[Math. 1]

$$Re = \frac{VD}{\nu} = \frac{VD\rho}{\mu} \tag{1}$$

As is clear from Equation (1), the Reynolds number Re of the liquid L flowing through each of the thin tubes 8C varies in accordance with the flow velocity V of the liquid L flowing through each of the thin tubes 8C, the inner diameter D of each of the thin tubes 8C, the kinematic viscosity ν of the liquid L, the density ρ of the liquid L, and the viscosity μ of the liquid L. Therefore, these parameters of the thin tubes 8C may be set so that, for example, the Reynolds number of the liquid L in the laminarization unit 8A is 2300 or less, preferably 1000 or less, and more preferably 500 or less.

For example, to facilitate the laminarization of the flow of the liquid L by the laminarization unit 8A, the inner diameter (diameter) of each of the thin tubes 8C may be 10 mm or less, preferably 5 mm or less, and more preferably 1 mm or less. To facilitate the manufacture of the laminarization unit 8A, the inner diameter (diameter) of each of the thin tubes 8C may be 0.01 mm or more, preferably 0.05 mm or more, and more preferably 0.1 mm or more. In these respects, the inner diameter (diameter) of each of the thin tubes 8C may be 0.01 mm or more and 10 mm or less, preferably 0.05 mm or more and 5 mm or less, and more preferably 0.1 mm or more and 1 mm or less.

When the inner diameter of each of the thin tubes 8C is reduced, the flow rate of the liquid flowing through the laminarization unit 8A is reduced. Therefore, to ensure sufficient flow rate of the liquid in the laminarization unit 8A, the number of thin tubes 8C in the laminarization unit 8A may be five or more, preferably 50 or more, more preferably 100 or more, and still more preferably 500 or more. To facilitate the manufacture of the laminarization unit 8A, the number of thin tubes 8C in the laminarization unit 8A may be 100000 or less, preferably 27000 or less, more preferably 18000 or less, and still more preferably 9000 or less. In these respects, the number of thin tubes 8C in the laminarization unit 8A may be five or more and 100000 or less, preferably 50 or more and 27000 or less, more preferably 100 or more and 18000 or less, and still more preferably 500 or more and 9000 or less.

A pressure loss ΔPa (Pa) of the liquid L in the laminarization unit 8A can be determined by Equation (2), which is the Hagen-Poiseuille equation. In Equation (2), Q is the flow rate ($m^2/s$) of the liquid L flowing through the laminarization unit 8A (all of the thin tubes 8C), μ is the viscosity (Pa·s) of the liquid L, n is the number of thin tubes 8C, D is the inner diameter (m) of each of the thin tubes 8C, and L is the length (m) of each of the thin tubes 8C.

[Math. 2]

$$\Delta\text{Pa} = \frac{128 \times \mu \times L \times Q}{n \times \pi \times D^4} \tag{2}$$

As is clear from Equation (2), the pressure loss ΔPa of the liquid L in the laminarization unit 8A varies in accordance with the flow rate Q of the liquid L flowing through the laminarization unit 8A, the viscosity μ of the liquid L, the number n of thin tubes 8C, the inner diameter D of each of the thin tubes 8C, and the length L of each of the thin tubes 8C. Therefore, these parameters of the thin tubes 8C may be set so that, for example, the pressure loss of the liquid L in the laminarization unit 8A is 10 kPa of more and 1000 kPa or less.

For example, to prevent excessive pressure loss of the liquid in the laminarization unit, the number of thin tubes 8C in the laminarization unit 8A may be five or more, preferably 50 or more, more preferably 100 or more, and still more preferably 500 or more. To facilitate the manufacture of the laminarization unit 8A, the number of thin tubes 8C in the laminarization unit 8A may be 100000 or less, preferably 27000 or less, more preferably 18000 or less, and still more preferably 9000 or less. In these respects, the number of thin tubes 8C in the laminarization unit 8A may be five or more and 100000 or less, preferably 50 or more and 27000 or less, more preferably 100 or more and 18000 or less, and still more preferably 500 or more and 9000 or less.

To prevent excessive pressure loss of the liquid in the laminarization unit, the inner diameter (diameter) of each of the thin tubes 8C may be 0.01 mm or more, preferably 0.05 mm or more, and more preferably 0.1 mm or more. To facilitate the manufacture of the laminarization unit 8A, the inner diameter (diameter) of each of the thin tubes 8C may be 10 mm or less, preferably 5 mm or less, and more preferably 1 mm or less. In these respects, the inner diameter (diameter) of each of the thin tubes 8C may be 0.01 mm or more and 10 mm or less, preferably 0.05 mm or more and 5 mm or less, and more preferably 0.1 mm or more and 1 mm or less.

To prevent excessive pressure loss of the liquid L in the laminarization unit, the length of each of the thin tubes 8C may be 1000 mm or less, preferably 500 mm or less, and more preferably 100 mm or less. To facilitate the manufacture of the laminarization unit 8A, the length of each of the thin tubes 8C may be 1 mm or more, preferably 5 mm or more, and more preferably 10 mm or more. In these respects, the length of each of the thin tubes 8C may be 1 mm or more and 1000 mm or less, preferably 5 mm or more and 500 mm or less, and more preferably 10 mm or more and 100 mm or less.

The laminarization of the liquid L in the bypass pipe 8 is achieved by the laminarization unit 8A. Therefore, the effect of laminarization of the liquid L in the bypass pipe 8 is enhanced as the ratio of the space occupied by the laminarization unit 8A in the bypass pipe 8 is increased. In this respect, the length of the laminarization unit 8A may be 1% or more, preferably 10% or more, and more preferably 50% or more of the length of the bypass pipe 8. To facilitate the manufacture of the laminarization unit 8A, the length of the laminarization unit 8A may be 100% or less, preferably 90% or less, and more preferably 80% or less of the length of the bypass pipe 8. In these respects, the length of the laminarization unit 8A may be 1% or more and 100% or less, preferably 10% or more and 90% or less, and more preferably 50% or more and 80% or less of the length of the bypass pipe 8.

The valve 9 is attached to the module passage pipe 7 to adjust the distribution ratio of the liquid L between the module passage pipe 7 and the bypass pipe 8. The valve 9 adjusts the distribution ratio of the liquid L between the module passage pipe 7 and the bypass pipe 8 so that, for example, the flow rate of the liquid L supplied to the module passage pipe 7 is (significantly) lower than the flow rate of the liquid L supplied to the bypass pipe 8. For example, when the resistivity-adjusted liquid L2 having a resistivity of 1.0 MΩ·cm is to be generated, the distribution ratio of the liquid L between the module passage pipe 7 and the bypass pipe 8 is about 1:3920 (module passage pipe 7: bypass pipe 8).

The valve 9 is, for example, attached to the upstream module passage pipe 71 to adjust the flow rate of the liquid L flowing through the upstream module passage pipe 71 by adjusting the opening degree of the flow passage 71A in the upstream module passage pipe 71. The valve 9 may be attached to the downstream module passage pipe 72 to adjust the flow rate of the adjustment gas-added liquid L1 flowing through the downstream module passage pipe 72 by adjusting the opening degree of the flow passage 72A in the downstream module passage pipe 72. Various commonly known valves may be used as the valve 9. For example, a needle valve may be used.

The branching module 11 is connected to the liquid supply pipe 3, the upstream module passage pipe 71, and the bypass pipe 8 to provide communication between the liquid supply pipe 3, the upstream module passage pipe 71, and the bypass pipe 8. The branching module 11 distributes the liquid L supplied to the liquid supply pipe 3 between the upstream module passage pipe 71 and the bypass pipe 8. The branching module 11 includes a flow passage 11A communicating with the flow passage 3A in the liquid supply pipe 3, the flow passage 71A in the upstream module passage pipe 71, and the flow passage 8D in each of the thin tubes 8C. The flow passage 11A has, for example, three branches communicating with the flow passage 3A in the liquid supply pipe 3, the flow passage 71A in the upstream module passage pipe 71, and the flow passage 8D in each of the thin tubes 8C.

The merging module 12 is connected to the liquid discharge pipe 4, the downstream module passage pipe 72, and the bypass pipe 8 to provide communication between the liquid discharge pipe 4, the downstream module passage pipe 72, and the bypass pipe 8. The merging module 12 merges the adjustment gas-added liquid L1 supplied to the downstream module passage pipe 72 and the liquid L supplied to the bypass pipe 8 and discharges the resistivity-adjusted liquid L2, which is a mixture of the adjustment gas-added liquid L1 and the liquid L, to the liquid discharge pipe 4. The merging module 12 includes a flow passage 12A communicating with the flow passage 4A in the liquid discharge pipe 4, the flow passage 72A in the downstream module passage pipe 72, and the flow passage 8D in each of the thin tubes 8C. The flow passage 12A has, for example, three branches communicating with the flow passage 4A in the liquid discharge pipe 4, the flow passage 72A in the downstream module passage pipe 72, and the flow passage 8D in each of the thin tubes 8C.

A method for adjusting the resistivity of the liquid L by using the resistivity adjustment device 1 will now be described.

In this method, the resistivity of the liquid L is adjusted by supplying the liquid L to the liquid supply pipe 3 and supplying the adjustment gas G to the gas-phase region GA of the hollow fiber membrane module 2.

More specifically, the liquid L is supplied to the liquid supply pipe 3, and the adjustment gas G is supplied to the gas supply pipe 5. The liquid L supplied to the liquid supply pipe 3 is distributed between the upstream module passage pipe 71 and the bypass pipe 8 by the branching module 11. The liquid supplied to the upstream module passage pipe 71 is supplied to the liquid-phase region LA of the hollow fiber membrane module 2. The adjustment gas G supplied to the gas supply pipe 5 is supplied to the gas-phase region GA of the hollow fiber membrane module 2. The adjustment gas G supplied to the gas-phase region GA passes through the hollow fiber membranes 21 and is dissolved into the liquid L supplied to the liquid-phase region LA. Thus, the adjustment gas-added liquid L1, which is the liquid L in which the adjustment gas G is dissolved, is generated. The adjustment gas-added liquid L1 is preferably adjustment-gas-saturated liquid obtained by dissolving the adjustment gas G into the liquid L to saturation. In other words, preferably, the supply pressure of the adjustment gas G, the flow rate of the liquid L supplied to the upstream module passage pipe 71, and other parameters are adjusted so that the adjustment gas G is dissolved in the liquid L to saturation. Here, the term "saturation" is not limited to complete saturation and includes a state close to saturation. The state close to saturation is a state in which the adjustment gas G is dissolved in the liquid L to an extent such that the resistivity of the liquid L can be adjusted based only on the distribution ratio of the liquid L between the upstream module passage pipe 71 the bypass pipe 8.

The adjustment gas-added liquid L1 is discharged from the liquid-phase region LA of the hollow fiber membrane module 2 to the downstream module passage pipe 72. The adjustment gas-added liquid L1 discharged from the liquid-phase region LA of the hollow fiber membrane module 2 to the downstream module passage pipe 72 merges with the liquid L supplied to the bypass pipe 8 in the merging module 12. Thus, the resistivity-adjusted liquid L2 having an adjusted resistivity is generated. The thus-generated resistivity-adjusted liquid L2 is discharged through the liquid discharge pipe 4. The valve 6A may be opened to discharge the adjustment gas G, for example, in the gas-phase region GA of the hollow fiber membrane module 2 through the gas discharge pipe 6.

As described above, in the resistivity adjustment device 1 according to the present embodiment, the bypass pipe 8 includes the laminarization unit 8A including the thin tubes 8C that are thinner than the module passage pipe 7, so that the laminarization of the flow of the liquid L in the bypass pipe 8 can be achieved. The pressure loss of liquid in a laminar flow is proportional to the flow rate of the liquid. Even when the flow is not laminar, the pressure loss of the liquid becomes more proportional to the flow rate of the liquid as the flow shifts from turbulent to laminar. The flow rate of the liquid L supplied to the module passage pipe 7 is lower than the flow rate of the liquid L supplied to the bypass pipe 8. Therefore, unlike the pressure loss of the liquid L in the bypass pipe 8, the pressure loss of the liquid L in the module passage pipe 7 and the hollow fiber membrane module 2 can be regarded as being proportional to the flow rate of the liquid L irrespective of whether or not the flow of the liquid L through the module passage pipe 7 and the hollow fiber membrane module 2 is turbulent. In other words, the tendency of the pressure loss of the liquid L in the bypass pipe 8 is close to the tendency of the pressure loss of the liquid L in the module passage pipe 7 and the hollow fiber membrane module 2. Therefore, even when the flow rate of the liquid L supplied to the resistivity adjustment device 1 varies, the variation in the distribution ratio of the liquid L between the module passage pipe 7 and the bypass pipe 8 can be suppressed, and accordingly the variation in the resistivity of the resistivity-adjusted liquid can be suppressed. In particular, even when the liquid L is supplied to the resistivity adjustment device 1 at a low flow rate, the increase in the ratio of the liquid L supplied to the bypass pipe 8 to the liquid L supplied to the module passage pipe 7 can be suppressed, so that the increase in the resistivity of the resistivity-adjusted liquid L2 can be suppressed. Therefore, even when the flow rate at which the liquid L is supplied varies, the variation in the resistivity of the resistivity-adjusted liquid L2 can be suppressed by using a simple structure.

In the resistivity adjustment device 1, the laminarization unit 8A may be set so that when ultrapure water is supplied to the bypass pipe 8 as the liquid L at a specified flow rate, the flow of the liquid L in the laminarization unit 8A is laminar. In such a case, the laminarization unit 8A can be easily designed and, even when the flow rate at which the liquid L is supplied varies, the variation in the resistivity of the resistivity-adjusted liquid L2 can be further suppressed.

In addition, in the resistivity adjustment device 1, the laminarization unit 8A may be set so that when ultrapure water is supplied to the bypass pipe 8 as the liquid L at a specified flow rate, the Reynolds number in the laminarization unit 8A is 2300 or less. In such a case, the laminarization unit 8A can be easily designed and, even when the flow rate at which the liquid L is supplied varies, the variation in the resistivity of the resistivity-adjusted liquid L2 can be further suppressed.

In addition, in the resistivity adjustment device 1, the number of thin tubes 8C in the laminarization unit 8A may be five or more, preferably 50 or more, more preferably 100 or more, and still more preferably 500 or more. In such a case, the liquid flows through the laminarization unit at a sufficient flow rate, and the laminarization of the flow of the liquid in the laminarization unit can be facilitated.

In addition, in the resistivity adjustment device 1, the inner diameter of each of the thin tubes 8C may be 0.01 mm or more and 10 mm or less, preferably 0.05 mm or more and 5 mm or less, and more preferably 0.1 mm or more and 1 mm or less. In such a case, the pressure loss of the liquid L in the laminarization unit 8A does not become excessively large or small, and the laminarization of the flow of the liquid in the laminarization unit 8A can be facilitated.

In addition, in the resistivity adjustment device 1, the length of each of the thin tubes 8C may be 1 mm or more and 1000 mm or less, preferably 5 mm or more and 500 mm or less, and more preferably 10 mm or more and 100 mm or less. In such a case, the pressure loss of the liquid L in the laminarization unit 8A does not become excessively large or small.

In addition, in the resistivity adjustment device 1, the length of the laminarization unit 8A may be 1% or more, preferably 10% or more, and more preferably 50% or more of the length of the bypass pipe 8. In such a case, the laminarization of the flow of the liquid in the bypass pipe 8 can be facilitated.

In addition, since the resistivity adjustment device 1 includes the branching module 11 and the merging module 12, the branching structure connecting the liquid supply pipe 3 to the upstream module passage pipe 71 and the bypass pipe 8 and the merging structure connecting the downstream module passage pipe 72 and the bypass pipe 8 to the liquid discharge pipe 4 can be easily provided. In particular, since the bypass pipe 8 includes the laminarization unit 8A including the thin tubes 8C, the bypass pipe 8 can be easily connected to the liquid supply pipe 3 with the branching module 11, and to the liquid discharge pipe 4 with the merging module 12. Since the laminarization unit 8A extends from the branching module 11 to the merging module 12, the laminarization unit 8A can be easily formed, and the laminarization of the flow of liquid L in the laminarization unit 8A can be facilitated.

In addition, since the resistivity adjustment device 1 includes the gas supply pipe 5 and the gas discharge pipe 6, the adjustment gas G can be easily supplied to and discharged from the gas-phase region GA of the hollow fiber membrane module 2.

In addition, since the resistivity adjustment device 1 includes the valve 9, the distribution ratio of the liquid L between the module passage pipe 7 and the bypass pipe 8 can be easily adjusted. Since the valve 9 is attached to the module passage pipe 7, the laminarization by the bypass pipe 8 is not impeded by the valve 9.

In the resistivity adjustment method according to the present embodiment, the resistivity of the liquid L is adjusted in the above-described resistivity adjustment device 1 by supplying the liquid L to the liquid supply pipe 3 and supplying the adjustment gas G to the gas-phase region GA of the hollow fiber membrane module 2. Therefore, even when the flow rate at which the liquid L is supplied varies, the variation in the resistivity of the resistivity-adjusted liquid L2 can be suppressed by using a simple structure.

Although an embodiment of the present invention is described above, the present invention is not limited to the embodiment.

For example, in the above-described embodiment, the resistivity adjustment device 1 includes the gas supply pipe 5 and the gas discharge pipe 6. However, at least one of the gas supply pipe 5 and the gas discharge pipe 6 may be omitted from the resistivity adjustment device 1 as long as the adjustment gas G can be supplied to the gas-phase region GA of the hollow fiber membrane module 2.

In the above-described embodiment, the resistivity adjustment device 1 includes the valve 9. However, the valve 9 may be omitted from the resistivity adjustment device 1 if the distribution ratio of the liquid L between the module passage pipe 7 and the bypass pipe 8 can be adjusted by means other than the valve 9. The valve 9 may also be omitted from the resistivity adjustment device 1 when the distribution ratio of the liquid L between the module passage pipe 7 and the bypass pipe 8 is not adjusted.

In addition, in the above-described embodiment, the resistivity adjustment device 1 includes the branching module 11 and the merging module 12. However, at least one of the branching module 11 and the merging module 12 may be omitted from the resistivity adjustment device 1 if means other than the branching module 11 and the merging module 12 can distribute the liquid L supplied to the liquid supply pipe 3 between the upstream module passage pipe 71 and the bypass pipe 8 and merge the adjustment gas-added liquid L1 supplied to the downstream module passage pipe 72 with the liquid L supplied to the bypass pipe 8. In this case, the liquid supply pipe 3 may be directly connected to the upstream module passage pipe 71 and the bypass pipe 8, and the liquid discharge pipe 4 may be directly connected to the downstream module passage pipe 72 and the bypass pipe 8.

EXAMPLE

An example of the present invention will now be described. However, the present invention is not limited to the example described below.

Example 1

A resistivity adjustment device of Example 1 was produced. The resistivity adjustment device of Example 1 was similar to the resistivity adjustment device 1 illustrated in FIGS. 1, 3 and 4 with the exceptions described below. In the resistivity adjustment device of Example 1, SEPAREL PF-001L-NA produced by DIC Corporation was used as the hollow fiber membrane module. A bundle of 9000 thin tubes with an outer diameter of 0.225 mm, an inner diameter of 0.175 mm, and a length of 110 mm was used as a laminarization layer including thin tubes. In the resistivity adjustment device of Example 1, the inner diameter (diameter) of the liquid supply pipe was 10 mm, the inner diameter (diameter) of the liquid discharge pipe was 10 mm, and the inner diameter (diameter) of the module passage pipe (upstream module passage pipe and downstream module passage pipe) was 4 mm.

Comparative Example 1

A resistivity adjustment device of Comparative Example 1 was also produced. The resistivity adjustment device of Comparative Example 1 was similar to the resistivity adjustment device of Example 1 except that one tube having an outer diameter of 8 mm, an inner diameter of 6 mm, and a length of 110 mm was used as the bypass pipe.

(Evaluation)

Figure 5:
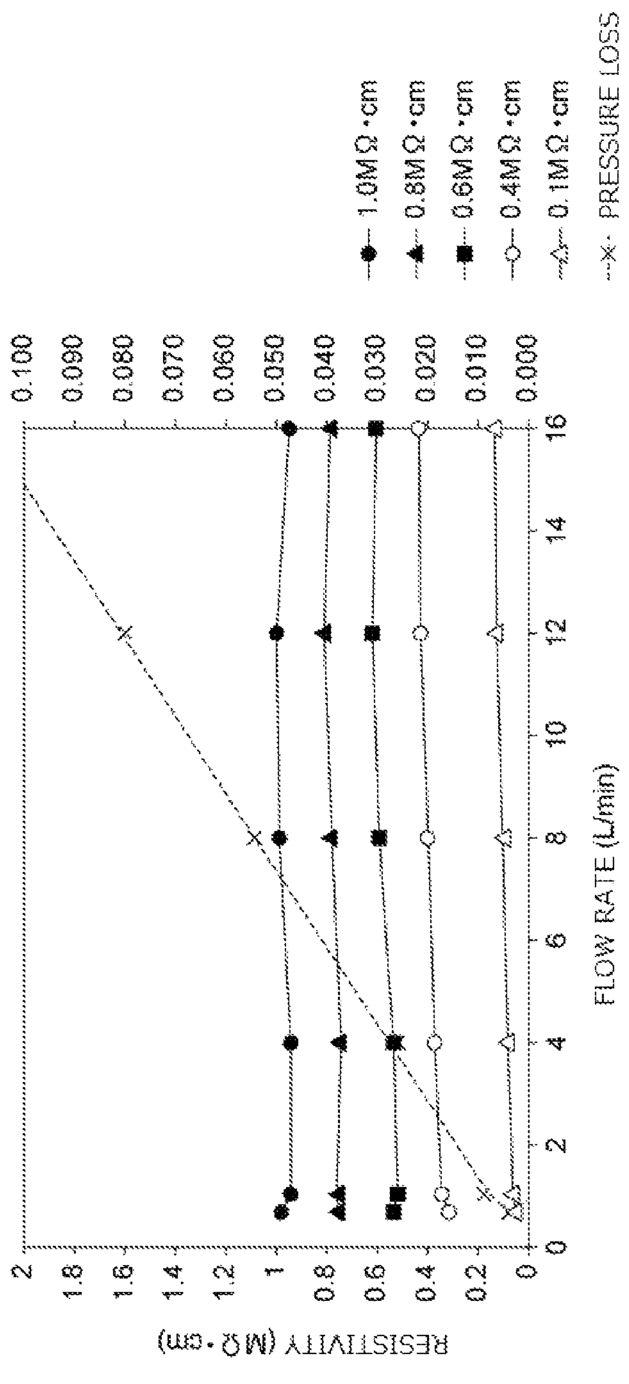
FIG. 5 is a graph showing the measurement result of the resistivity of resistivity-adjusted liquid according to Example 1.

The measurements described below were performed using each of the resistivity adjustment device of Example 1 and the resistivity adjustment device of Comparative Example 1. In an environment at room temperature (25° C.), liquid at 25° C. was supplied to the liquid supply pipe at a flow rate of 8 L, and adjustment gas at 25° C., 0.1 MPa was supplied to the gas supply pipe. The distribution ratio of the liquid between the module passage pipe and the bypass pipe was adjusted by adjusting the open/closed state of the valve so that the resistivity-adjusted liquid had a predetermined resistivity. The liquid was ultrapure water. The adjustment gas was carbon dioxide. The predetermined resistivity was set to five values: 0.1 MΩ·cm, 0.4 MΩ·cm, 0.6 MΩ·cm, 0.8 MΩ·cm, and 1.0 MΩ·cm. For each state of the valve corresponding to one of the resistivities, the flow rate of the liquid supplied to the liquid supply pipe was successively changed every five minutes to 16 L/mm, 12 L/mm, 8 L/mm, 4 L/mm, and 1 L/mm, and the resistivity of the resistivity-adjusted liquid was measured. The pressure loss of the liquid in the bypass pipe was also measured under the conditions for setting the resistivity of the resistivity-adjusted liquid to 1.0 MΩ·cm. FIG. 5 shows the measurement result of Example 1, and FIG. 6 shows the measurement result of Comparative Example 1.

Figure 6:
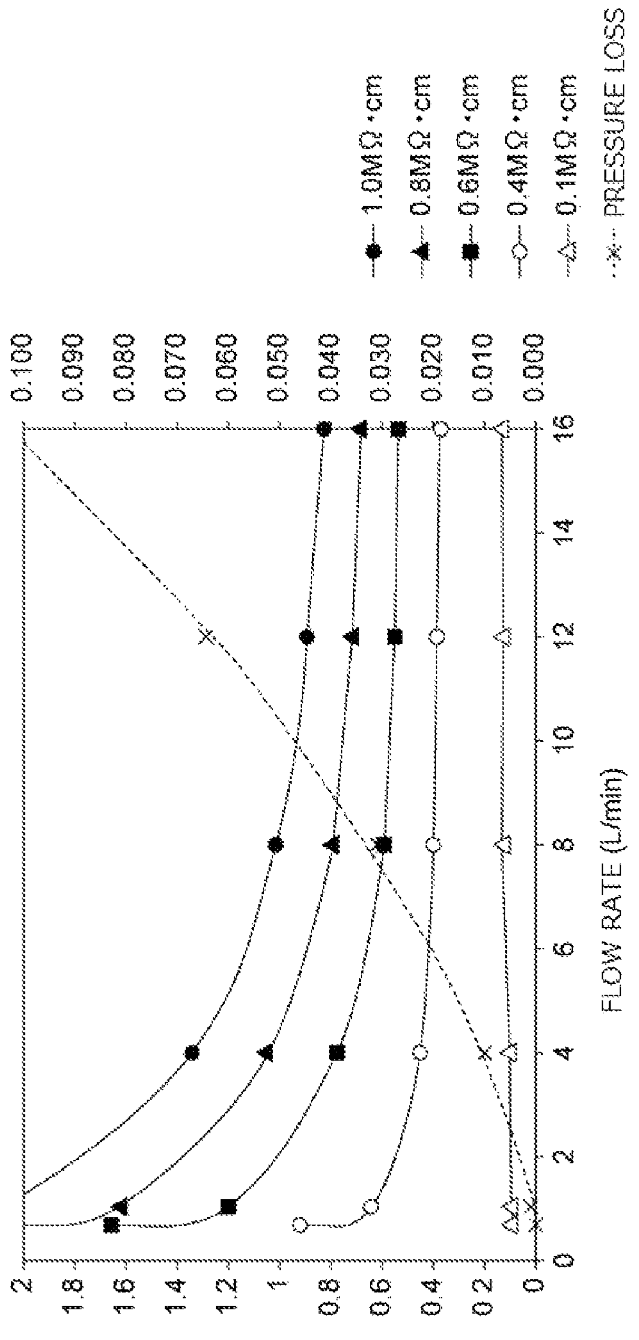
FIG. 6 is a graph showing the measurement result of the resistivity of resistivity-adjusted liquid according to Comparative Example 1.

As is clear from FIG. 6, in the resistivity adjustment device of Comparative Example 1, under the conditions for setting the resistivity of the resistivity-adjusted liquid to 0.1 MΩ·cm at a flow rate of 8 L, the resistivity only slightly varied as the flow rate of the liquid was varied. However, under other flow rate conditions, the resistivity greatly varied as the flow rate of the liquid was varied. The variation in the resistivity increased as the flow rate of the liquid was reduced.

In contrast, as is clear from FIG. 5, in the resistivity adjustment device of Example 1, the resistivity only slightly varied as the flow rate of the liquid was varied under all flow rate conditions, and the variation in the resistivity did not increase even when the flow rate of the liquid was reduced.

Figure 7:
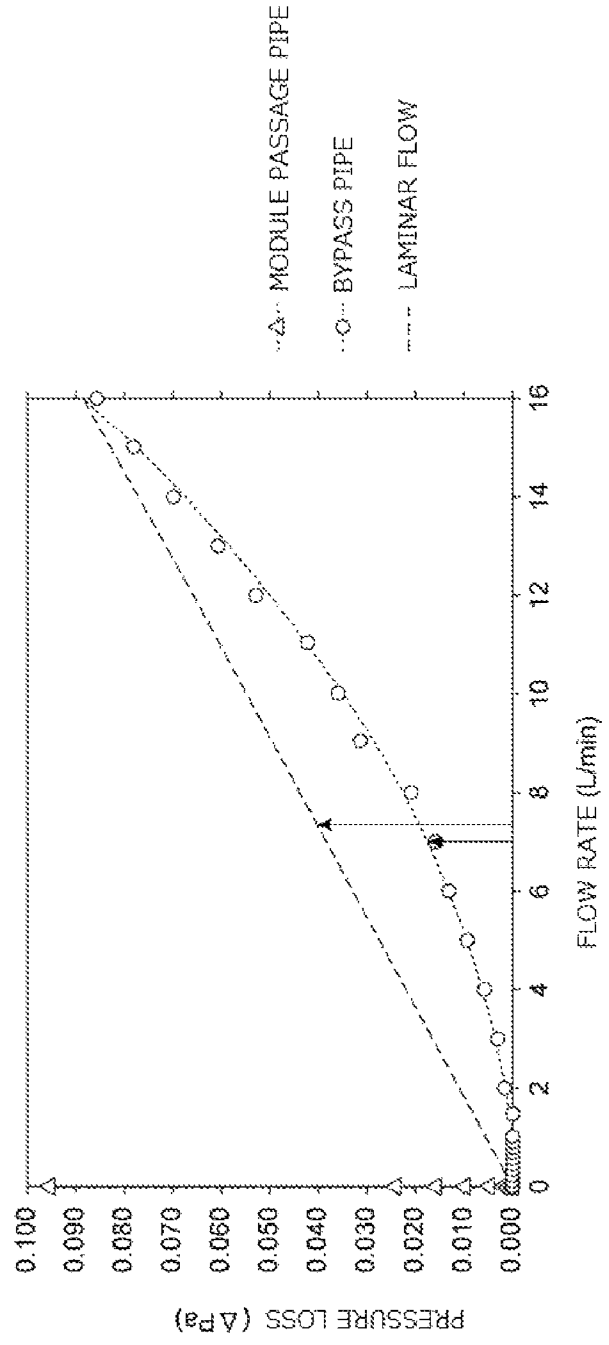
FIG. 7 is a graph showing the measurement result of the pressure loss of the liquid in the module passage pipe and the bypass pipe and the liquid in the bypass pipe according to Comparative Example 1.

The measurements described below were performed using the resistivity adjustment device of Comparative Example 1. In an environment at room temperature (25° C.), liquid at 25° C. was supplied to the liquid supply pipe at a flow rate of 16 L, and adjustment gas at 25° C., 0.1 MPa was supplied to the gas supply pipe. The inner diameter and the length of the bypass pipe were adjusted so that the pressure loss of the liquid in the bypass pipe was 0.09 Pa. Then, in the environment at room temperature (25° C.), liquid at 25° C. was supplied to the liquid supply pipe at a flow rate of 8 L, and adjustment gas at 25° C., 0.1 MPa was supplied to the gas supply pipe. The distribution ratio of the liquid between the module passage pipe and the bypass pipe was adjusted by adjusting the open/closed state of the valve so that the resistivity-adjusted liquid had a resistivity of 1.0 MΩ·cm. The liquid was ultrapure water. The adjustment gas was carbon dioxide. Then, the flow rate of the liquid supplied to the liquid supply pipe was changed from 16 L/mm to 0.7 L/mm, and the pressure losses of the liquid in the module passage pipe and the bypass pipe were measured. The pressure loss of the liquid in the module passage pipe and the bypass pipe was determined as the pressure loss of the liquid along the path from the upstream module passage pipe to the downstream module passage pipe through the hollow fiber membrane module. FIG. 7 shows the measurement results. FIG. 7 also shows, as a reference, the pressure loss of the liquid in a bypass pipe in which the flow of the liquid is laminar.

Referring to FIG. 7, in the resistivity adjustment device of Comparative Example 1, the flow of the liquid in the bypass pipe is turbulent, and therefore the pressure loss of the liquid in the bypass pipe is exponential to the flow rate of the liquid. The flow rate of the liquid supplied to the module passage pipe is lower than the flow rate of the liquid supplied to the bypass pipe. Therefore, unlike the pressure loss of the liquid in the bypass pipe, the pressure loss of the liquid in the module passage pipe and the hollow fiber membrane module can be regarded as being proportional to the flow rate of the liquid irrespective of whether or not the flow of the liquid in the module passage pipe and the hollow fiber membrane module is turbulent. Thus, the tendency of the pressure loss greatly differs between the liquid in the bypass pipe and the liquid in the module passage pipe and the hollow fiber membrane module.

For example, when the liquid is supplied to the bypass pipe at a flow rate of 16 L/min, the pressure loss of the liquid in the bypass pipe is about 0.09 Pa irrespective of whether the flow of the liquid in the bypass pipe is turbulent or laminar. However, when the liquid is supplied to the bypass pipe at a flow rate of 7 L/min, which is lower than 16 L/min, the pressure loss of the liquid is about 0.04 Pa when the flow of the liquid in the bypass pipe is laminar but is about 0.015 Pa when the flow of the liquid in the bypass pipe is turbulent. Thus, the pressure loss of the liquid in the bypass pipe is smaller when the flow of the liquid in the bypass pipe is turbulent than when the flow of the liquid in the bypass pipe is laminar. As a result, the distribution ratio of the liquid supplied the bypass pipe to the liquid supplied to the module passage pipe increases. When the flow rate of the liquid supplied to the bypass pipe is higher than 16 L/min, the tendency is reversed.

Therefore, referring to FIG. 6, in the resistivity adjustment device of Comparative Example 1, it may be that as the flow rate at which the liquid was supplied was varied, the distribution ratio of the liquid between the module passage pipe and the bypass pipe varied (shifted), and the resistivity of the resistivity-adjusted liquid varied accordingly. In particular, it may be that when the flow rate of the liquid supplied to the resistivity adjustment device was reduced, the distribution ratio of the liquid supplied to the bypass pipe to the liquid supplied to the module passage pipe increased, and the resistivity of the resistivity-adjusted liquid increased accordingly.

In contrast, in the resistivity adjustment device of Example 1, unlike the resistivity adjustment device of Comparative Example 1, the flow of the liquid in the bypass pipe is subjected to laminarization, so that the pressure loss of the liquid in the bypass pipe is proportional to the flow rate of the liquid. In other words, the tendency of the pressure loss of the liquid in the bypass pipe is close to the tendency of the pressure loss of the liquid in the module passage pipe and the hollow fiber membrane module.

Therefore, referring to FIG. 5, in the resistivity adjustment device of Example 1, it may be that even when the flow rate at which the liquid was supplied was varied, the variation in the distribution ratio of the liquid between the module passage pipe and the bypass pipe was suppressed, and the variation in the resistivity of the resistivity-adjusted liquid was suppressed accordingly. In particular, it may be that even when the flow rate of the liquid supplied to the resistivity adjustment device was reduced, the increase in the distribution ratio of the liquid supplied to the bypass pipe to the liquid supplied to the module passage pipe was suppressed, so that the increase in the resistivity of the resistivity-adjusted liquid was suppressed.

REFERENCE SIGNS LIST

1 . . . resistivity adjustment device, 2 . . . hollow fiber membrane module, 3 . . . liquid supply pipe, 3A . . . flow passage, 4 . . . liquid discharge pipe, 4A . . . flow passage, 5 . . . gas supply pipe, 6 . . . gas discharge pipe, 6A . . . valve, 7 . . . module passage pipe, 8 . . . bypass pipe, 8A . . . laminarization unit, 8B . . . bypass housing, 8C . . . thin tube, 8D . . . flow passage, 8E . . . first sealing portion, 8F . . . upstream end face, 8G . . . second sealing portion, 8H . . . downstream end face, 9 . . . valve, 11 . . . branching module, 11A . . . flow passage, 12 . . . merging module, 12A . . . flow passage, 21 . . . hollow fiber membrane, 22 . . . housing, 22A . . . liquid supply port, 22B . . . liquid discharge port, 22C . . . gas supply port, 22D . . . gas discharge port, 71 . . . upstream module passage pipe, 71A . . . flow passage, 72 . . . downstream module passage pipe, 72A . . . flow passage, FD . . . flow direction, G . . . adjustment gas, GA . . . gas-phase region, L . . . liquid, L1 . . . adjustment gas-added liquid, L2 . . . resistivity-adjusted liquid, LA . . . liquid-phase region.

The invention claimed is:

1. The resistivity adjustment device comprising:
a hollow fiber membrane module sectioned into a liquid-phase region and a gas-phase region by a hollow fiber membrane, the liquid-phase region receiving liquid whose resistivity is to be adjusted, the gas-phase region receiving adjustment gas used to adjust a resistivity of the liquid;
a liquid supply pipe;
a liquid discharge pipe;
a module passage pipe communicating with the liquid-phase region of the hollow fiber membrane module, the liquid supply pipe, and the liquid discharge pipe and passing through the hollow fiber membrane module; and
a single bypass pipe communicating with the liquid supply pipe and the liquid discharge pipe and bypassing the hollow fiber membrane module,
wherein the single bypass pipe includes a laminarization unit including a plurality of thin tubes thinner than the module passage pipe.

2. The resistivity adjustment device according to claim 1, wherein the laminarization unit is set so that when ultrapure water is supplied to the bypass pipe as the liquid at a specified flow rate, a flow of the liquid in the laminarization unit is laminar.

3. The resistivity adjustment device according to claim 1, wherein the laminarization unit is set so that when ultrapure water is supplied to the bypass pipe as the liquid at a specified flow rate, a Reynolds number of the liquid flowing through the laminarization unit is 2300 or less.

4. The resistivity adjustment device according to claim 1, wherein the plurality of thin tubes comprises five or more thin tubes.

5. The resistivity adjustment device according to claim 1, wherein each of the plurality of thin tubes has an inner diameter of 0.01 mm or more and 10 mm or less.

6. The resistivity adjustment device according to claim 1, wherein each of the plurality of thin tubes has a length of 1 mm or more and 1000 mm or less.

7. The resistivity adjustment device according to claim 1, wherein the laminarization unit has a length of 1% or more of a length of the bypass pipe.

8. The resistivity adjustment device according to claim 1, further comprising:
a branching module connected to the liquid supply pipe, the module passage pipe, and the bypass pipe to provide communication between the liquid supply pipe, the module passage pipe, and the bypass pipe; and
a merging module connected to the liquid discharge pipe, the module passage pipe, and the bypass pipe to provide communication between the liquid discharge pipe, the module passage pipe, and the bypass pipe,
wherein the laminarization unit extends from the branching module to the merging module.

9. The resistivity adjustment device according to claim 1, further comprising:
a gas supply pipe communicating with the gas-phase region to enable the adjustment gas to be supplied to the gas-phase region; and a gas discharge pipe communicating with the gas-phase region to enable the adjustment gas to be discharged from the gas-phase region.

10. The resistivity adjustment device according to claim 1, further comprising:

a valve attached to the module passage pipe to adjust a distribution ratio of the liquid between the module passage pipe and the bypass pipe.

11. A resistivity adjustment method comprising:

adjusting a resistivity of liquid in the resistivity adjustment device according to claim 1 by supplying the liquid to the liquid supply pipe and supplying the adjustment gas to the gas-phase region of the hollow fiber membrane module.

12. The resistivity adjustment device according to claim 2, wherein the laminarization unit is set so that when ultrapure water is supplied to the bypass pipe as the liquid at a specified flow rate, a Reynolds number of the liquid flowing through the laminarization unit is 2300 or less.

13. The resistivity adjustment device according to claim 2, wherein the plurality of thin tubes comprises five or more thin tubes.

14. The resistivity adjustment device according to claim 2, wherein each of the plurality of thin tubes has an inner diameter of 0.01 mm or more and 10 mm or less.

15. The resistivity adjustment device according to claim 2, wherein each of the plurality of thin tubes has a length of 1 mm or more and 1000 mm or less.

16. The resistivity adjustment device according to claim 2, wherein the laminarization unit has a length of 1% or more of a length of the bypass pipe.

17. The resistivity adjustment device according to claim 2, further comprising:

a branching module connected to the liquid supply pipe, the module passage pipe, and the bypass pipe to provide communication between the liquid supply pipe, the module passage pipe, and the bypass pipe; and a merging module connected to the liquid discharge pipe, the module passage pipe, and the bypass pipe to provide communication between the liquid discharge pipe, the module passage pipe, and the bypass pipe, wherein the laminarization unit extends from the branching module to the merging module.

18. The resistivity adjustment device according to claim 2, further comprising:

a gas supply pipe communicating with the gas-phase region to enable the adjustment gas to be supplied to the gas-phase region; and a gas discharge pipe communicating with the gas-phase region to enable the adjustment gas to be discharged from the gas-phase region.

19. The resistivity adjustment device according to claim 2, further comprising:

a valve attached to the module passage pipe to adjust a distribution ratio of the liquid between the module passage pipe and the bypass pipe.

20. A resistivity adjustment method comprising:

adjusting a resistivity of liquid in the resistivity adjustment device according to claim 2 by supplying the liquid to the liquid supply pipe and supplying the adjustment gas to the gas-phase region of the hollow fiber membrane module.

* * * * *